(12) United States Patent
Iwasaki et al.

(10) Patent No.: US 10,165,190 B2
(45) Date of Patent: Dec. 25, 2018

(54) ELECTRONIC DEVICE

(71) Applicant: CANON KABUSHIKI KAISHA, Tokyo (JP)

(72) Inventors: Shogo Iwasaki, Kawasaki (JP); Jun Kamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/534,044

(22) PCT Filed: Jan. 6, 2016

(86) PCT No.: PCT/JP2016/000044
§ 371 (c)(1),
(2) Date: Jun. 8, 2017

(87) PCT Pub. No.: WO2016/121298
PCT Pub. Date: Aug. 4, 2016

(65) Prior Publication Data
US 2017/0347034 A1   Nov. 30, 2017

(30) Foreign Application Priority Data
Jan. 27, 2015   (JP) ................................. 2015-012898

(51) Int. Cl.
*G06F 3/044* (2006.01)
*G03B 17/04* (2006.01)
(Continued)

(52) U.S. Cl.
CPC ......... *H04N 5/23293* (2013.01); *G03B 17/04* (2013.01); *H04N 5/2252* (2013.01); *H04N 5/23245* (2013.01)

(58) Field of Classification Search
CPC ....................... H04N 5/23293; H04N 5/23245
See application file for complete search history.

(56) References Cited

U.S. PATENT DOCUMENTS

| | | | | |
|---|---|---|---|---|
| 2010/0144405 A1* | 6/2010 | Hakamata | ............. | G06F 1/1622 455/575.3 |
| 2010/0234073 A1* | 9/2010 | Kusano | ................... | G06F 1/162 455/566 |

FOREIGN PATENT DOCUMENTS

| JP | 2005-159391 A | 6/2005 |
|---|---|---|
| JP | 2005-303688 A | 10/2005 |

(Continued)

OTHER PUBLICATIONS

The foreign references 1-3 were cited in the International Search Report of the corresponding International Application, PCT/JP2016/000044 dated Apr. 5, 2016.

*Primary Examiner* — Mekonnen D Dagnew
(74) *Attorney, Agent, or Firm* — Cowan, Liebowitz & Latman, P.C.

(57) ABSTRACT

An imaging apparatus includes a movable unit in which a display unit is rotatable by a hinge part in an opening and closing direction with respect to a device body. A magnet is disposed in the vicinity of the hinge part and an opening and closing sensor detects the opening and closing of the movable unit by detecting a magnetic field of the magnet. A magnetizing direction of the magnet is a direction perpendicular to an opening and closing axis of the movable unit, the opening and closing sensor detects the magnetic field in a direction perpendicular to the opening and closing axis, and a control unit obtains a detection signal of the opening and closing sensor and controls a display state of the display unit.

9 Claims, 11 Drawing Sheets

(51) Int. Cl.
*H04N 5/225* (2006.01)
*H04N 5/232* (2006.01)

(56) References Cited

FOREIGN PATENT DOCUMENTS

JP  2010-103921 A  5/2010
JP  2012-042743 A  3/2012

* cited by examiner

[Fig. 1A]
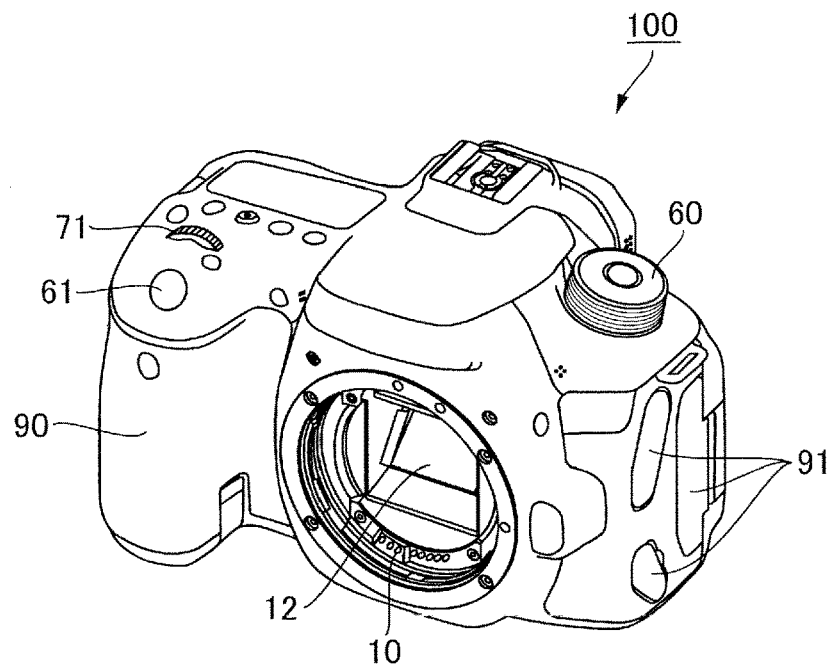
[Fig. 1B]
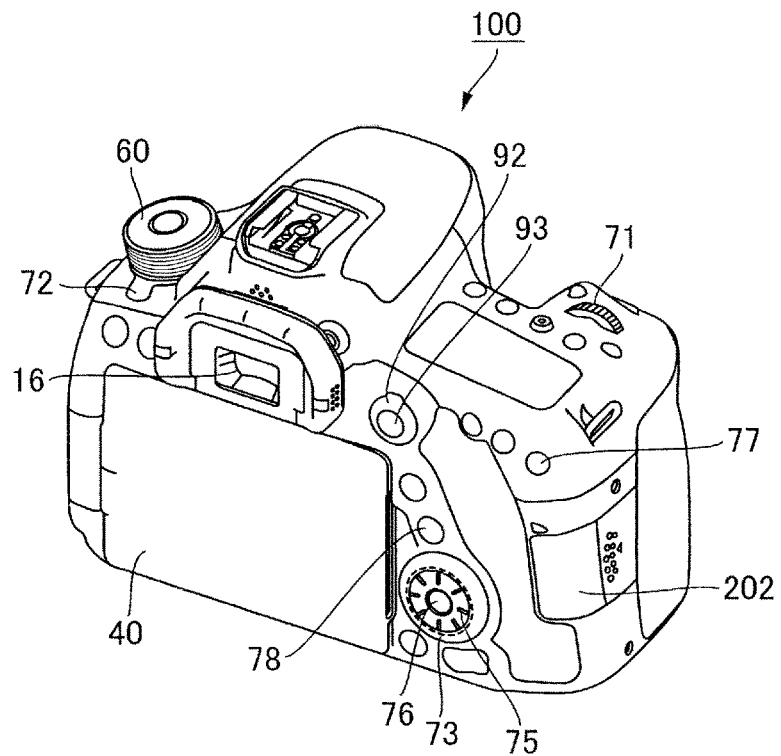

[Fig. 2]
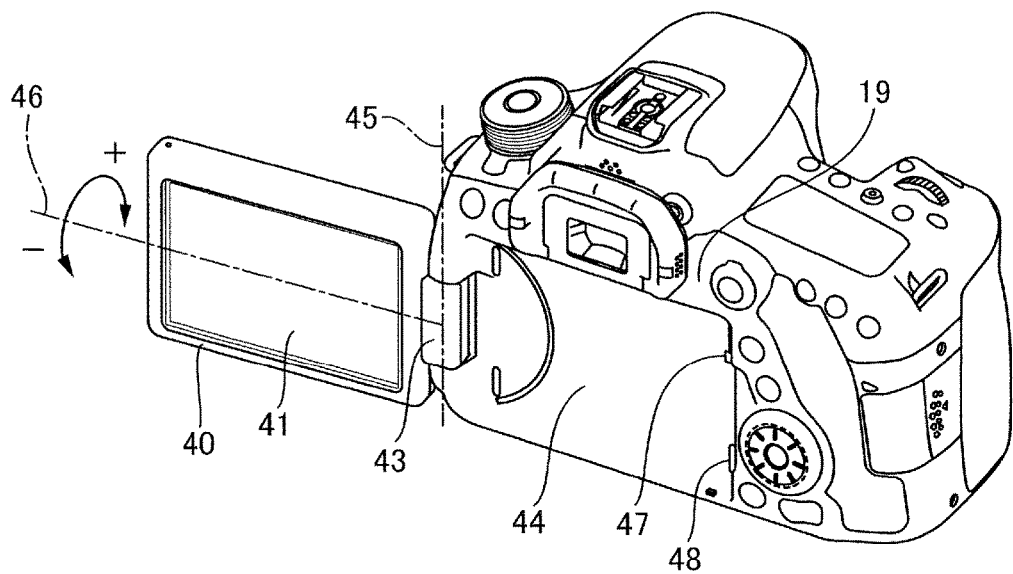

[Fig. 3A]
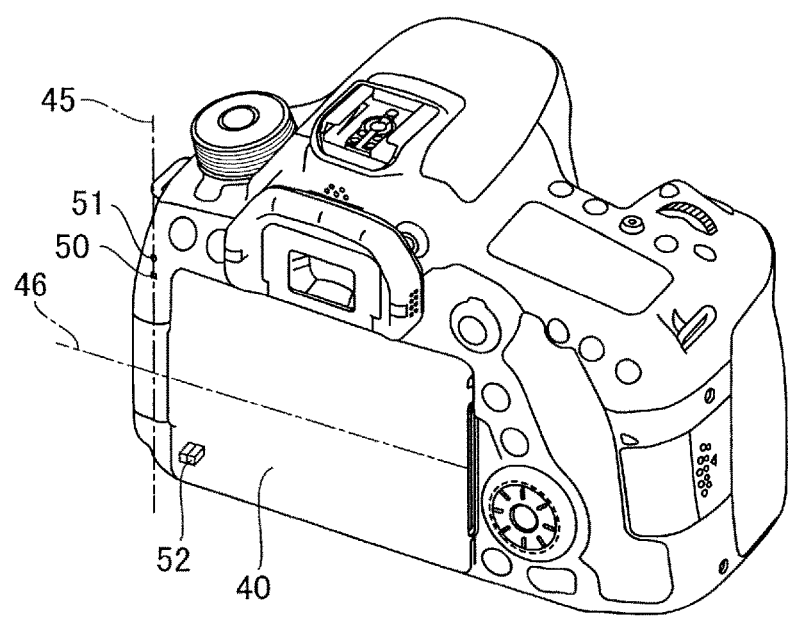
[Fig. 3B]
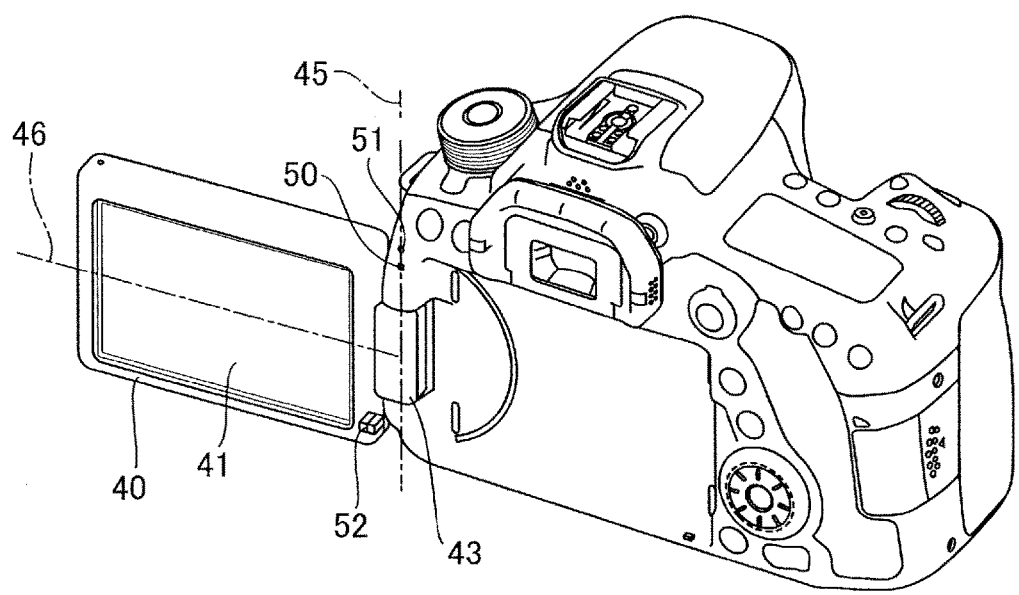

[Fig. 3C]
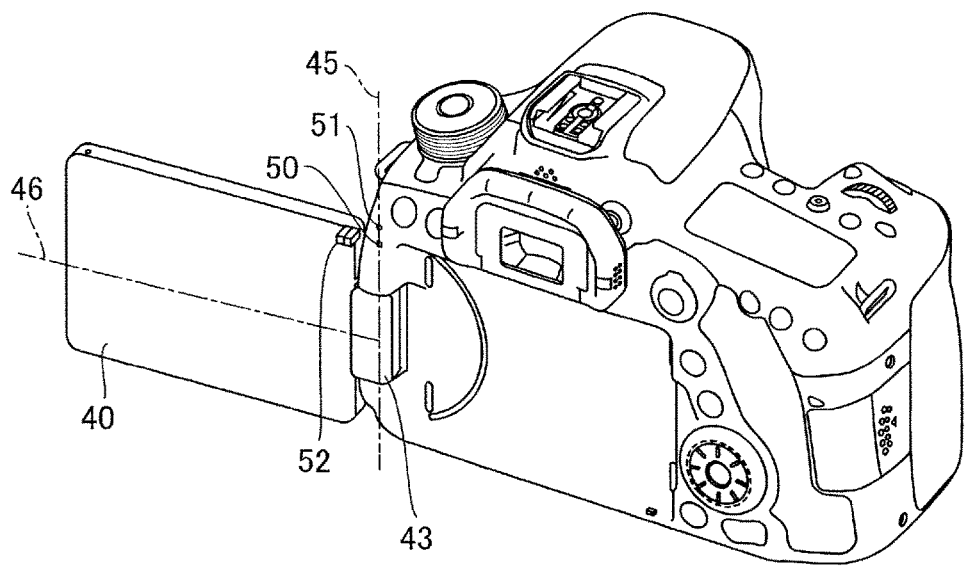
[Fig. 3D]
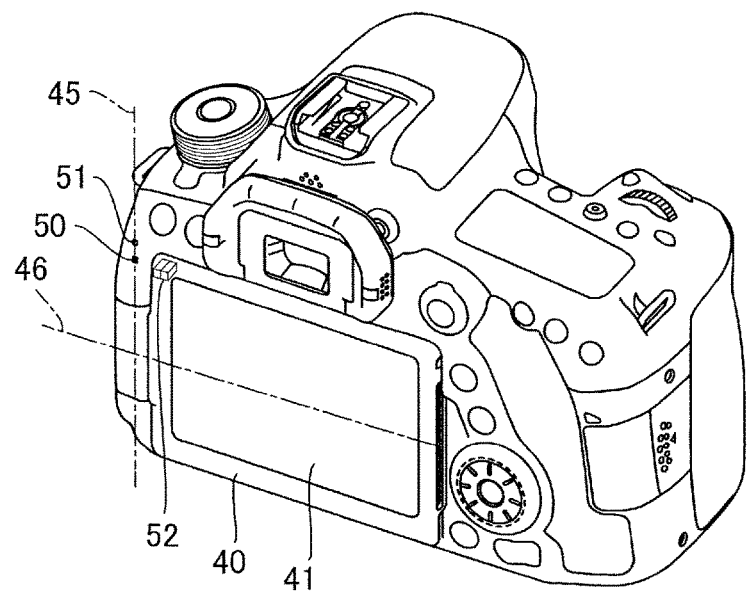

[Fig. 4A]
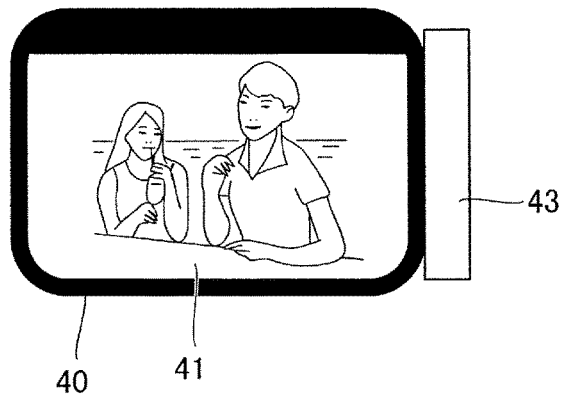
[Fig. 4B]
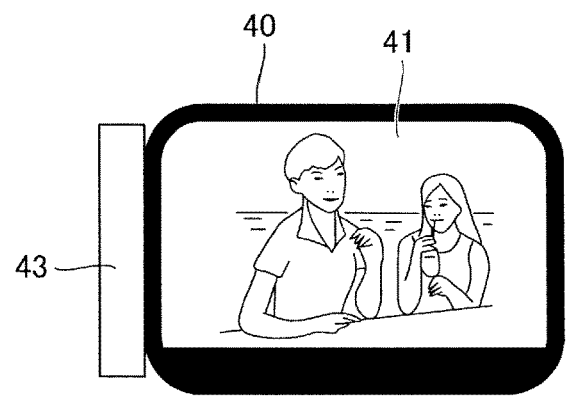
[Fig. 4C]
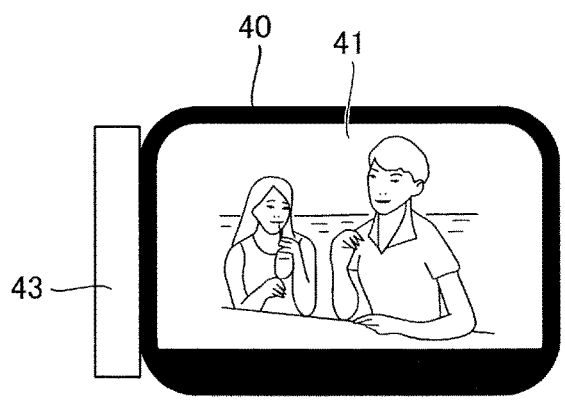

[Fig. 5]
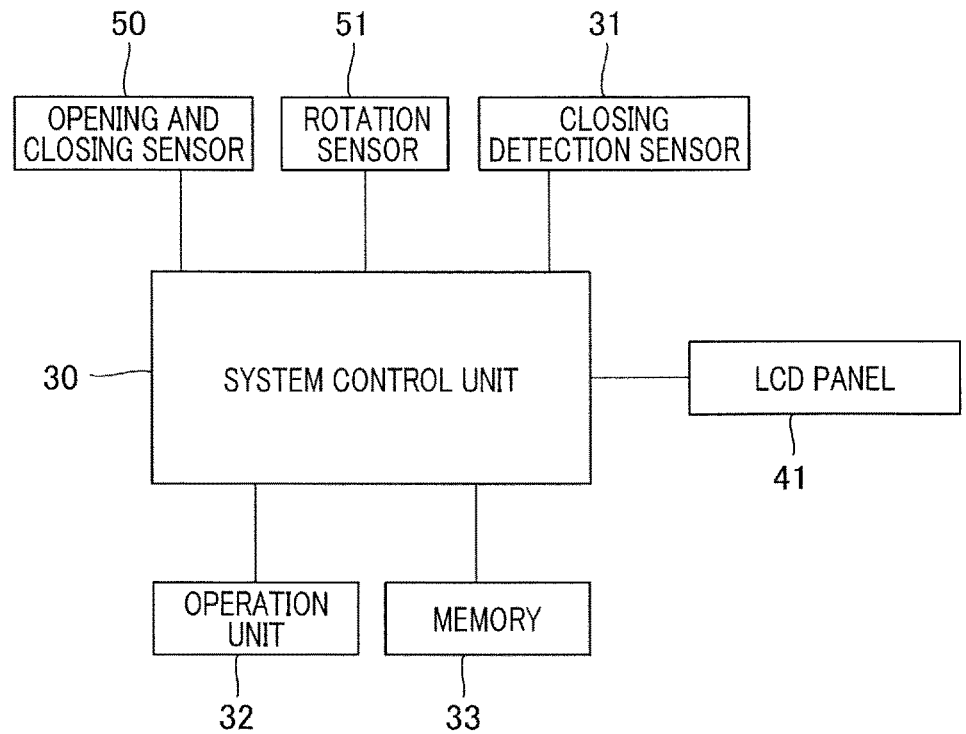
[Fig. 6]
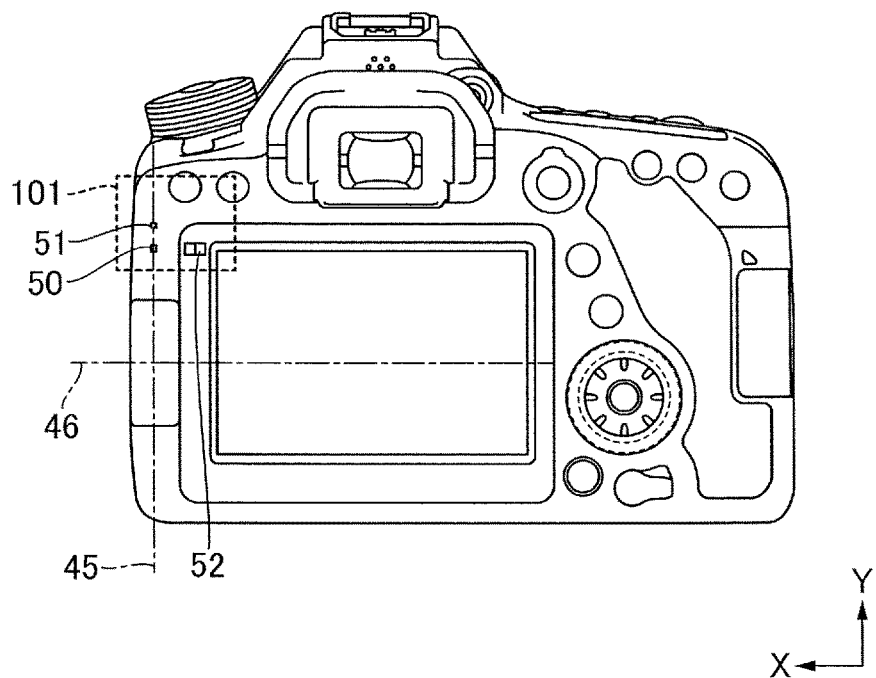

[Fig. 7A]
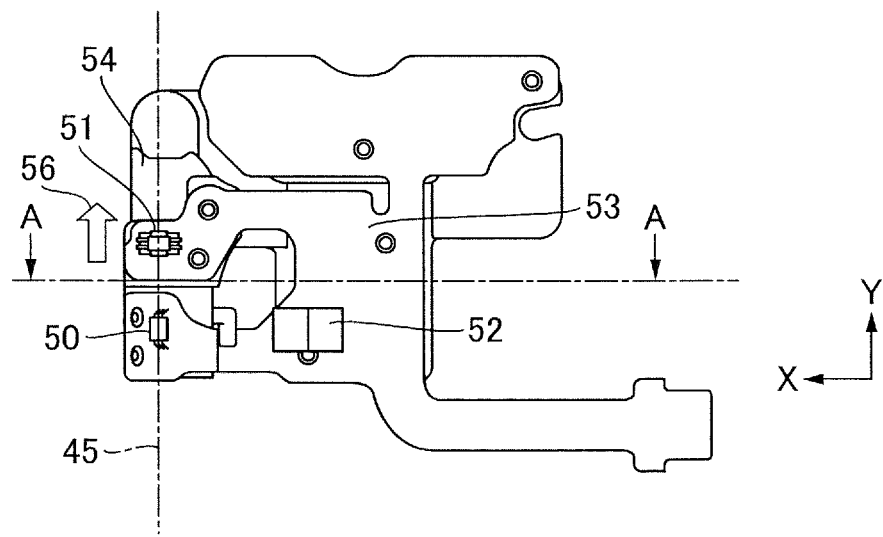
[Fig. 7B]
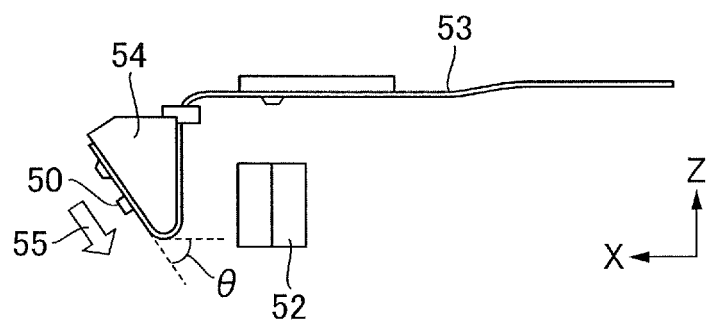

[Fig. 7C]
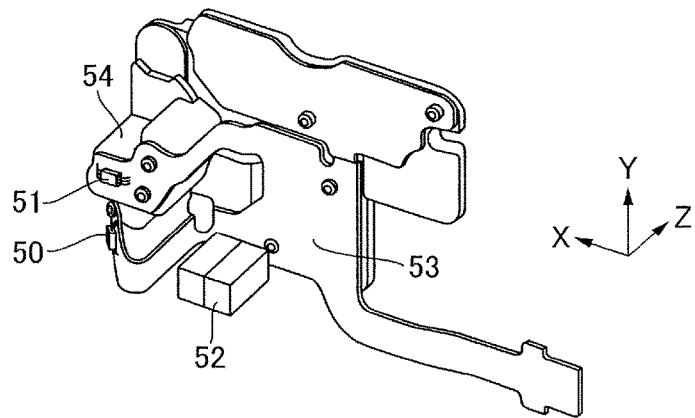
[Fig. 8A]
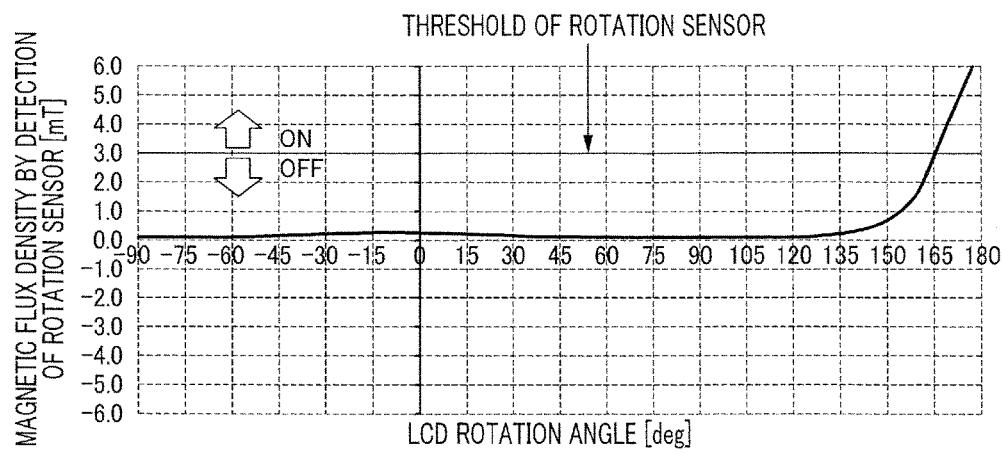
[Fig. 8B]
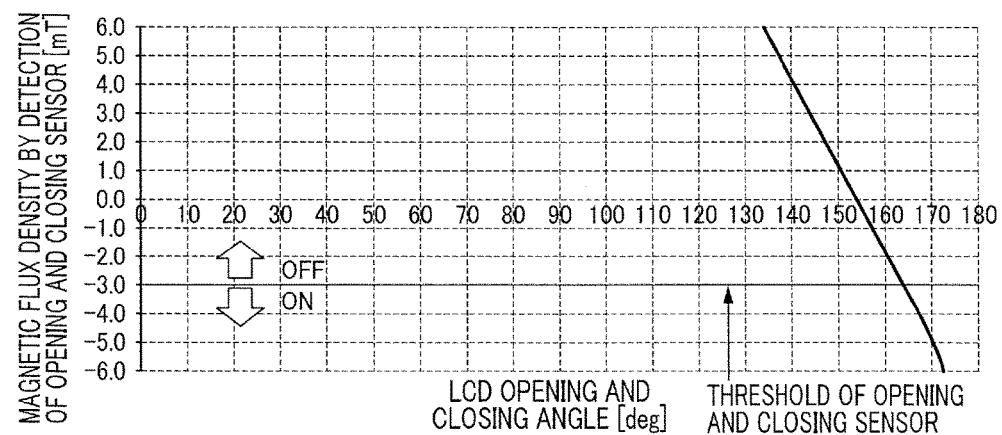

[Fig. 8C]
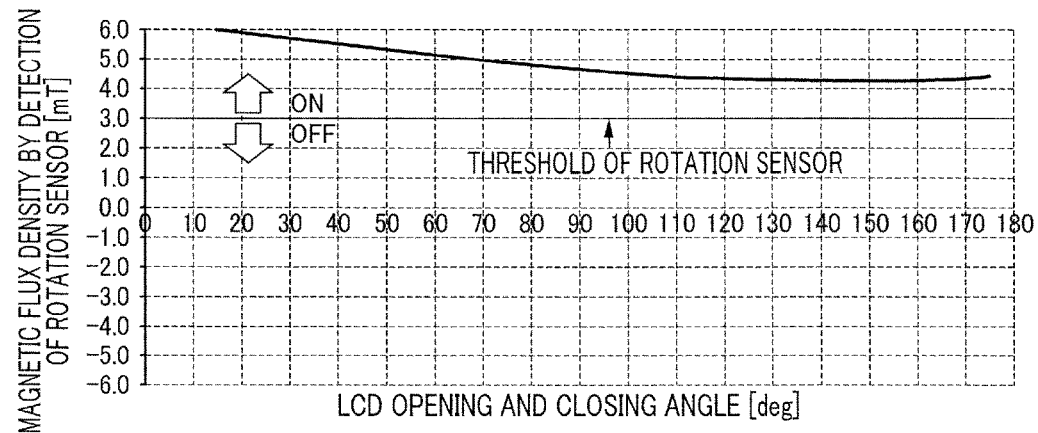
[Fig. 9A]
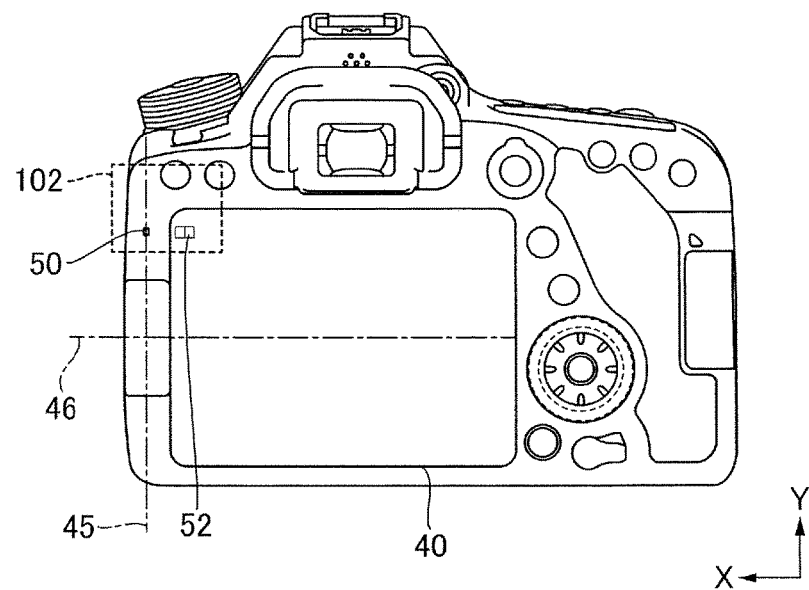

[Fig. 9B]
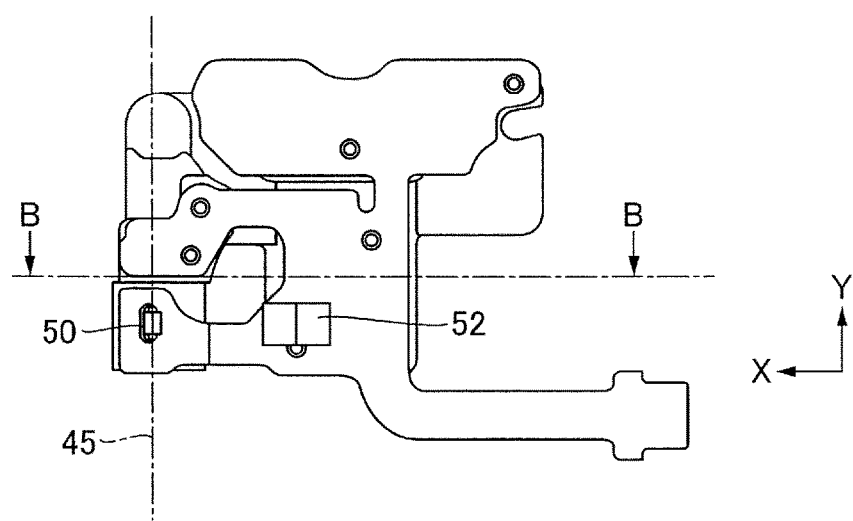

[Fig. 9C]
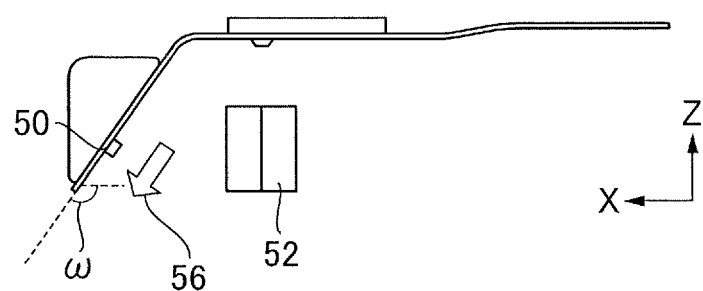

ELECTRONIC DEVICE

TECHNICAL FIELD

The invention relates to an electronic device including a movable display unit.

BACKGROUND ART

Conventionally, there has been a device having a display unit that is openable, closable, and rotatable with respect to a device body in a digital camera, a video camera, and the like. The device performs inversion processing of an image displayed on the display unit in vertical and horizontal directions according to an opening and closing state or a rotating state of the display unit, and performs switching processing between turning on and turning off of a light. Additionally, a magnet and a magnetic sensor are used for detecting the opening and closing or the rotation of the display unit. This is because this can save a space and improve non-contact reliability. In Patent Literature 1, a device that uses the magnetic sensor for detecting each of the opening and closing and the rotation and then switching a display state of the display unit is disclosed.

CITATION LIST

Patent Literature

Patent Literature 1: Japanese Patent Laid-Open No. 2012-42743

In the prior art disclosed in the Patent Literature 1, when the design change of the detection angle of the display unit is performed, it is difficult to intuitively understand how a desired angle is obtained by changing any of the parameters, and the redesign for a desired detection angle is necessary after repeating, for example, simulations. Additionally, there may be cases where increasing the outer size is necessary for achieving the desired detection angle.

SUMMARY OF INVENTION

In an electronic device having a movable display unit, the invention facilitates the magnetic detection of opening and closing of a display unit and the design of an opening and closing detection angle without increasing the size of device.

An electronic device according to the invention comprises a body unit; a movable unit; a two-axis rotation means that connects the body unit and the movable unit; a magnetic field generating means disposed in the movable unit; a first magnetic sensor, which is disposed in the body unit, detects a magnetic field generated by the magnetic field generating means and outputs a signal; and a second magnetic sensor that is disposed in the body unit, detects a magnetic field generated by the magnetic field generating means and outputs a signal, wherein the two-axis rotation means has a first axis and a second axis orthogonal to the first axis, wherein the magnetic field generating means generates a magnetic field orthogonal to the first axis direction, wherein the first magnetic sensor is disposed to detect a magnetic field in the first axis direction, wherein the second magnetic sensor detects a magnetic field in a direction orthogonal to the first axis, and wherein the first magnetic sensor and the second magnetic sensor are disposed to align in the first axis direction in the vicinity of the first axis.

According to the invention, it is possible to magnetically detect the opening and closing of the display unit without increasing the size of the electronic device, including the movable display unit, and is possible to easily design the opening and closing detection angle of the display unit.

Further features of the invention will become apparent from the following description of exemplary embodiments with reference to the attached drawings.

BRIEF DESCRIPTION OF DRAWINGS

FIGS. 1A and 1B are perspective views illustrating external views of an imaging apparatus according to an embodiment of the invention.

FIG. 2 is a perspective view illustrating an imaging apparatus in a state in which a movable display unit of FIG. 1 opens.

FIGS. 3A to 3D illustrate the operations of the movable display unit of FIG. 1 and the arrangement of each sensor and a magnet.

FIGS. 4A to 4C illustrate display states in each operation of the movable display unit of FIG. 3.

FIG. 5 is a block diagram illustrating a configuration example of the imaging apparatus of the present embodiment.

FIG. 6 is a rear view of the imaging apparatus of the present embodiment.

FIGS. 7A to 7C illustrate details of the arrangement of an opening and closing sensor, a rotation sensor, and the magnet of the present embodiment.

FIGS. 8A to 8C illustrate relations between an operation of the movable display unit and magnetic flux density detected by each sensor in the present embodiment.

FIGS. 9A to 9C illustrate an imaging apparatus according to a modification.

DESCRIPTION OF EMBODIMENTS

Hereinafter, a detailed description will be given of preferred embodiments of the invention with reference to the accompanying drawings. FIGS. 1A and 1B are external views that illustrate an imaging apparatus that includes a digital camera as one example of an electronic device according to the embodiment of the invention. FIG. 1A is a perspective view when an imaging apparatus 100 is viewed from the front side, and FIG. 1B is a perspective view when the imaging apparatus 100 is viewed from the rear side. FIG. 1A illustrates a device body of the imaging apparatus 100 in a state in which an attachable and detachable shooting lens is removed. Note that a description will be given of a positional relation of each unit by defining a subject side as the front side. The imaging apparatus 100 includes a movable display unit (hereinafter, referred to as "movable unit") 40. FIG. 2 is a perspective view that illustrates the movable unit 40 in an open state at the rear of the imaging apparatus 100.

A shutter button 61 shown in FIG. 1A is an operation member that configures an operation unit for performing a shooting instruction by a user. A mode switching switch 60 is an operation member for switching between various modes. Terminal covers 91 positioned on the side of the imaging apparatus 100 protects a connector (not illustrated), for example, a connection cable that connects between an external device and the imaging apparatus 100. A main electronic dial 71 is a rotation operation member provided on the upper surface of a grip part 90. The user rotates the main electronic dial 71, and can perform, for example, the change of various setting values, including a shutter speed and an aperture value.

A power switch 72 shown in FIG. 1B is an operation member that is used when the user switches the power of the imaging apparatus 100 between ON and OFF. A sub electronic dial 73 is a rotation operation member positioned on the rear of the imaging apparatus 100, and is used when the user performs operations, for example, a movement of a selection frame and image feeding. A SET button 75 is a push button and is mainly used for determining a selection item. A multi controller 76 can be tilted in vertical and horizontal directions, and the operation in each direction is possible. An enlargement button 77 is an operation button that is used when the user performs the ON or OFF operation of an enlargement mode and changes a magnification during the enlargement mode in a live-view (hereinafter, also referred to as "LV") display in a shooting mode. The enlargement button 77 functions to enlarge a play image in a play mode and increase the magnification. A play button 78 is an operation button used when the user switches between the shooting mode and the play mode. The mode transits to the play mode when the user depresses the play button 78 during the shooting mode. An LV lever 92 is an operation member used when the user performs switching between a still image shooting mode and a movie shooting mode. An LV button 93 is an operation member used when the user switches the live view display ON and OFF in the still image shooting mode. In the movie shooting mode, the LV button 93 is used to command the start and stop of the movie shooting (recording).

A quick return mirror 12 shown in FIG. 1A is a movable optical member provided inside of the device body, and is commanded from a system control unit (reference numeral 30 in FIG. 5) and rotated by an actuator (not illustrated). A communication terminal 10 is a communication terminal for performing the communication between a shooting lens unit (not illustrated) and the device body in a state in which the shooting lens unit is mounted on the imaging apparatus 100. An eyepiece finder 16 shown in FIG. 1B is a viewfinder for confirming a focusing state of the subject image and a layout through the lens unit by the user's observation of a focusing screen (not illustrated). A lid 202 that is positioned on the side surface of the device body is an opening and closing lid for a slot for attaching and detaching a recording medium. The grip part 90 is a grasping part having a shape that is easy to grasp with the right hand when the user holds the imaging apparatus 100.

As shown in FIG. 2, the movable unit 40 includes an LCD (liquid crystal display) panel 41. The movable unit 40 is attached to the device body by a two-axis rotating mechanism. That is, the movable unit 40 is rotatably supported by a hinge unit 43 in the horizontal opening and closing direction around an opening and closing axis 45, and is rotatably supported in a rotational direction around a rotation axis 46. In FIG. 2, the longitudinal direction of the LCD panel 41, which serves as a display unit, represents the horizontal direction, and the direction of the opening and closing axis 45 represents the vertical direction. The rotation axis 46 is an axis that extends in a direction orthogonal to the opening and closing axis 45 (the longitudinal direction of the LCD panel 41).

An accommodation surface part 44 is a part at which the movable unit 40 faces the device body during accommodation, and is a concave bottom surface part provided in a rear cover 19 in the open state. The rear cover 19 includes a locking claw 47 and can be locked when the movable unit 40 is accommodated in the rear cover 19. The accommodation surface part 44 includes an elastic member 48. When the movable unit 40 is in a closed state and is being locked by the locking claw 47, the elastic member 48 transitions to a compression state and urges the movable unit 40 to the locking claw 47. Hereinafter, concerning the state of the opening and closing and the rotation of the movable unit 40, the opening and closing angle of 0 degrees and the rotation angle of 0 degrees are provided in a state in which the LCD panel 41 is accommodated in the accommodation surface part 44 to face each other (see FIG. 1B). The upper limit value of the opening and closing angle is at 175 degrees, and the range of the rotation angle is up to 180 degrees in the +direction and up to 90 degrees in the −direction shown in FIG. 2.

FIGS. 3A to 3D are perspective views illustrating different states when the opening and closing operation of the movable unit 40 is performed. FIGS. 4A to 4C illustrate the states of the display screen of the LCD panel 41 during the LV shooting in each state shown in FIG. 3A to 3D. An opening and closing sensor 50 and a rotation sensor 51 that detect the operating state of the movable unit 40 are arranged inside of the device body. The opening and closing sensor 50 detects the opening and closing of the movable unit 40, and the rotation sensor 51 detects the rotation of the movable unit 40. FIGS. 3A to 3D illustrate the movable unit 40 and the device body in a state in which they are partially transparent. A giant magneto resistance (GMR) element that detects a magnetic field parallel to a mounting surface is used for the opening and closing sensor 50 and the rotation sensor 51. Additionally, a magnet 52 for causing the sensors 50 and 51 to react is disposed inside of the movable unit 40. The magnet 52 provided for generating a magnetic field is disposed near the end of the hinge unit 43 side in the longitudinal direction of the movable unit 40.

FIG. 3A is a perspective view illustrating a closed state of the movable unit 40, which shows a state having the opening and closing angle of 0 degrees, and the rotation angle of 0 degrees. In the movable unit 40 in this state, the LCD panel 41 is accommodated so as to face the accommodating surface part 44. When the closed state is detected by a closing detection sensor (reference numeral 31 in FIG. 5), the LCD panel 41 is turned off by the control of the system control unit (reference numeral 30 in FIG. 5). When the user is going to open the movable unit 40 around the opening and closing axis 45 in this state, the closed state detection by the closing detection sensor transits to "OFF" at a predetermined angle. At this time, the LCD panel 41 transits to a state in which the light is turned on by the control of the system control unit.

FIG. 3B is a perspective view illustrating an open state of the movable unit 40, which shows a state having the opening and closing angle of 175 degrees and the rotation angle of 0 degrees. This state shows that the movable unit 40 fully opens around the opening and closing axis 45, and the display state of the LCD panel 41 at this time hereinafter is referred to as "normal display". FIG. 4A illustrates the LCD panel 41 of the normal display. When the user rotates the movable unit 40 in the +direction around the rotation axis 46 from the state shown in FIG. 3B, the opening and closing sensor 50 and the rotation sensor 51 detect the magnetic field of the magnet 52 at a predetermined angle. Subsequently, when the user further rotates the movable unit 40 in the +direction, the state transitions to the state shown in FIG. 3C.

FIG. 3C is a perspective view illustrating a state in which the display surface is directed to the front side in the open state of the movable unit 40, which shows the state having the opening and closing angle of 175 degrees and the rotation angle of +180 degrees. This state shows that the movable unit 40 is fully rotated at +180 degrees around the rotation axis 46. The opening and closing sensor 50 and the rotation sensor 51 have detected the magnetic field of the magnet 52, and the display state of the LCD panel 41 is illustrated so as to be seen from the front side in FIG. 4B. The display on the LCD panel 41 is controlled by the system control unit and transits from the normal display to a vertically inverted display (mirror image display when viewed by the photographer), and consequently a display suitable for a self-portrait photograph by a photographer is obtained. When the user is going to close the movable unit 40 around the opening and closing axis 45 from the state in FIG. 3C, the opening and closing sensor 50 no longer detects the magnetic field of the magnet 52 at a predetermined angle, and only the rotation sensor 51 detects the magnetic field of the magnet 52. Subsequently, when the user further closes the movable unit 40, the state transitions to the state shown in FIG. 3D.

FIG. 3D is a perspective view illustrating a state in which the movable unit 40 is in the closed state and the display surface is directed backward, having the opening and closing angle of 0 degrees and the rotation angle of +180 degrees. This state shows that the movable unit 40 is accommodated in the recess of the rear cover 19 so that the photographer can see the LCD panel 41 of the movable unit 40, and only the rotation sensor 51 is detecting the magnetic field of the magnet 52. The display state of the LCD panel 41 at this time is shown in FIG. 4C. The display on the LCD panel 41 is controlled by the system control unit, and the display transits from the normal display to a vertically and horizontally inverted display. This is an appearance and a sense of use similar to an electronic device attached with a display unit on its back, not having the movable unit 40.

Next, a description will be given of a principal part of the configuration of the imaging apparatus 100 with reference to FIG. 5. FIG. 5 is a block diagram in relation to a display control of the LCD panel 41. The system control unit 30 controls the entire imaging apparatus 100, and integrally controls an image display and an imaging operation and the like. An operation unit 32 includes, for example, the shutter button 61 and a main electronic dial 71, and is provided with various operation members as an input unit that accepts an operation from the user. A control program and the like are stored in a memory 33, and the system control unit 30 uses the program and data. The closing detection sensor 31, the opening and closing sensor 50, and the rotation sensor 51 output respective detection signals to the system control unit 30. The system control unit 30 obtains the detection signals output from each sensor and performs a display control of the LCD panel 41.

With reference to FIG. 6 and FIGS. 7A to 7C, a detailed description will be given of the arrangement of the opening and closing sensor 50, the rotation sensor 51, and the magnet 52. FIG. 6 is a view when the imaging apparatus 100 in the state shown in FIG. 3D is viewed from the rear side. In this state, the longitudinal direction of the rectangular display screen is defined as the X-axis direction. The direction orthogonal to the X-axis direction in the drawing of FIG. 6 is defined as the Y-axis direction, and the direction orthogonal to the drawing is defined as the Z-axis direction. FIG. 7A is a detailed view of a range 101 shown in FIG. 6, wherein, while the periphery of the opening and closing sensor 50, the rotation sensor 51, and the magnet 52 are enlarged, the other areas are not shown. In FIG. 7A, the horizontal direction shows the X-axis direction, and the vertical direction shows the Y-axis direction. Additionally, FIG. 7B is a cross-sectional view along with a line A-A in FIG. 7A. In FIG. 7B, the horizontal direction shows the X-axis direction and the vertical direction shows the Z-axis direction. FIG. 7C is a perspective view, and each of the X-axis, Y-axis, and Z-axis directions is as shown in the drawing.

As shown in FIG. 6, the opening and closing sensor 50 and the rotation sensor 51 are arranged on the opening and closing axis, and they each detect the magnetic field of the magnet 52. In FIG. 7A, the left side of the magnet 52 is the north pole and the right side thereof is the south pole, and the magnet 52 is disposed so as to have a magnetization direction in the X-axis direction. The opening and closing sensor 50 and the magnet 52 are arranged on the same plane perpendicular to the opening and closing axis 45.

The opening and closing sensor 50 and the rotation sensor 51 are mounted on an FPC (flexible printed board) 53. The FPC 53 is affixed to a resin component 54 by a double-sided tape. As shown in FIG. 7B, the mounting surface and the affixed surface of the opening and closing sensor 50 in the resin component 54 has a tilt (see angle of θ) to the XY plane. In other words, the opening and closing sensor 50 is mounted in a tilted state, and the angle of θ indicates an angle between the mounting surface and the affixed surface of the opening and closing sensor 50 with respect to the X-axis direction when viewed from the Y-axis direction. As shown by the direction of an arrow 55 in FIG. 7B, the opening and closing sensor 50 is arranged to detect the magnetic field in a direction having a predetermined tilt angle of θ in the XZ plane. That is, the opening and closing sensor 50 is capable of detecting a magnetic field parallel to the mounting surface. Additionally, as shown by the direction of an arrow 56 in FIG. 7A, the rotation sensor 51 is arranged to detect the magnetic field in a direction parallel to the mounting surface and the opening and closing axis 45 (Y-axis direction).

The measurement center of the magnetic field detection for both of the opening and closing sensor 50 and the rotation sensor 51 is located on the opening and closing axis 45 of the movable unit 40. The distance between the measurement center of the magnetic field detection of the opening and closing sensor 50 and the rotation axis 46 of the movable unit 40 equals or is nearly equal to the distance between the center of the magnet 52 and the rotation axis 46 of the movable unit 40. The reason is that the opening and closing sensor 50 more strongly detects the magnetic field of the magnet 52. Additionally, in this arrangement, the rotation sensor 51 is positioned where the measurement center of the magnetic field detection most strongly receives the magnetic field of the magnet 52 on the opening and closing axis 45, and is positioned off from the opening and closing sensor 50 by a predetermined distance.

Next, a description will be given of a relation between a movement of the movable unit 40 and the magnetic flux density detected by each sensor, with reference to FIGS. 8A to 8C. FIG. 8A illustrates a change of the magnetic flux density detected by the rotation sensor 51 when the movable unit 40 is moved from the state in FIG. 3B to the state in FIG. 3C.

The horizontal axis represents a rotation angle of the movable unit 40 (unit: degree) and the vertical axis represents the magnetic flux density detected by the rotation sensor 51 (unit: mT). In FIG. 8A, a threshold of the magnetic flux density detected by the rotation sensor 51 is also shown, and when the magnetic flux density exceeds the threshold, ON-detection is provided, and when the magnetic flux density is equal to or less than the threshold, OFF-detection is provided.

During the transition from the state of FIG. 3B to the state in FIG. 3C, the opening and closing angle is fixed at 175 degrees, and the rotation angle changes from 0 degrees to +180 degrees. In this case, because the magnetic flux density by the magnet 52 exceeds a threshold of the rotation sensor 51 in the vicinity of the rotation angle of 165 degrees, the rotation sensor 51 outputs an ON signal. In contrast, although the rotational angle gradually changes from 0 degrees to −90 degrees when the movable unit 40 is rotated in the reverse direction, the magnetic flux density by the magnet 52 does not exceed the threshold of the rotation sensor 51, and thus the rotation sensor 51 outputs an OFF signal.

FIG. 8B illustrates the change of the magnetic flux density detected by the opening and closing sensor 50 when the movable unit 40 is moved from the state shown in FIG. 3D to the state in FIG. 3C. The horizontal axis represents an opening and closing angle of the movable unit 40 (unit: degree), and the vertical axis represents the magnetic flux density detected by the opening and closing sensor 50 (unit: mT). In FIG. 8B, a threshold of the magnetic flux density detection by the opening and closing sensor 50 is also shown, and when the magnetic flux density is over the threshold, OFF-detection is provided, and when the magnetic flux density is equal to or less than the threshold, ON-detection is provided.

During the transition from the state of FIG. 3D to the state in FIG. 3C, the rotation angle is fixed at +180 degrees, and the opening and closing angle changes from 0 degrees to 175 degrees. In this case, because the magnetic flux density due to the magnet 52 is less than the threshold of the opening and closing sensor 50 in the vicinity of the rotation angle of 163 degrees, the opening and closing sensor 50 outputs an ON signal. If the value of the opening and closing detection angle is requested to be changed, the tilt of the attachment of the opening and closing sensor 50 (angle of θ in FIG. 7B) may be changed. For example, if the value of the opening and closing detection angle is requested to be changed from in the vicinity of 163 degrees to in the vicinity of 170 degrees, the tilt angle of θ of the resin component 54 shown in FIG. 7B is changed so as to be increased. In this case, it may be possible that a magnetic detection direction is rotated at approximately 7 degrees in the XZ plane without changing the measurement center position of the opening and closing sensor 50. Accordingly, simulations and the like are not necessary when the opening and closing detection angle is changed to a desired angle, and an intuitive and easy design is possible. Additionally, according to this configuration, the response is possible by only changing the tilt angle of the attachment without changing the position of the opening and closing sensor 50, and thereby, for example, not to affect an external part or not to cause increasing the size of the device.

FIG. 8C illustrates the change of the magnetic flux density detected by the rotation sensor 51 when the movable unit 40 is moved from the state shown in FIG. 3D to the state in FIG. 3C. The horizontal axis represents the opening and closing angle of the movable unit 40 (unit: degree), and the vertical axis represents the magnetic flux density detected by the rotation sensor 51 (unit: mT). In FIG. 8C, a threshold of the magnetic flux density detection by the rotation sensor 51 is also shown, and when the magnetic flux density exceeds the threshold, ON-detection is provided, and when the magnetic flux density is equal to or less than the threshold, OFF-detection is provided.

During the transition from the state of FIG. 3D to the state in FIG. 3C, the rotation angle is fixed at +180 degrees, and the opening and closing angle changes from 0 degrees to 175 degrees. As shown in FIG. 8C, because the magnetic flux density by the magnet 52 is always over the threshold of the rotation sensor 51, the rotation sensor 51 outputs an ON signal. This is because the magnet 52 and the rotation sensor 51 are arranged so as not to change the relation between the magnetization direction of the magnet 52 and the magnetic field detecting direction of the rotation sensor 51 due to the opening and closing of the movable unit 40. Note that because the magnet 52 and the two sensors (50 and 51) are operated while sufficiently maintaining the distance between them during the transition of the state from FIG. 3A to FIG. 3B, neither sensor detects the magnetic flux density that exceeds the threshold.

Table 1 shows the detection state of each sensor, and the display states of the LCD panel 41 at that time.

TABLE 1

| | The state of FIG. 3A | The state of FIG. 3B | The state of FIG. 3C | The state of FIG. 3D |
| --- | --- | --- | --- | --- |
| The state of display unit | Turning off the light (by the closing detection sensor) | Normal display | Vertical inversion | Vertical and horizontal inversion |
| Detection of the opening and closing sensor | OFF | OFF | ON | OFF |
| Detection of the rotation sensor | OFF | OFF | ON | ON |

When the movable unit 40 is in the state of FIG. 3A, the LCD panel 41 is in a state in which the light is turned off by the detection of the closing detection sensor 31, and as described above, the opening and closing sensor 50 and the rotation sensor 51 are both in the state of OFF-detection. When the movable unit 40 is in the state of FIG. 3B, the LCD panel 41 is in the normal display state, and as described above, the opening and closing sensor 50 and the rotation sensor 51 are both in the state of OFF-detection. The system control unit 30 controls the LCD panel 41, and accordingly performs the normal display including an image captured by the image sensor.

When the movable unit 40 is in the state of FIG. 3C, the LCD panel 41 displays the image captured by the image sensor and the like in a vertically inverted state, according to the control of the system control unit 30. In this state, a display that is suitable for a self-portrait photograph by a photographer is obtained, and as described above, the opening and closing sensor 50 and the rotation sensor 51 are both in the state of ON-detection.

When the movable unit 40 is in the state of FIG. 3D, the LCD panel 41 displays the image captured by the image sensor and the like in a vertically and horizontally inverted state, according to the control of the system control unit 30. That is, an appearance and sense of use similar to an electronic device attached with a display unit on the back, not having the movable unit 40 is provided. In this case, the opening and closing sensor 50 is in the state of OFF-detection and the rotation sensor 51 is in the state of ON-detection as described above. Note that Table 1 does not describe a case in which the opening and closing sensor 50 is in the state of ON-detection and the rotation sensor 51 is in the state of OFF-detection. In this case, in the movable unit 40, the LCD panel 41 is in the state of normal display.

As described above, according to the present embodiment, in the operating state detection of the movable unit 40, it is possible to intuitively and easily change the opening and closing detection angle by the opening and closing sensor 50 by devising a layout of the opening and closing sensor 50 and the magnet 52. Therefore, it is possible to easily perform the design of the opening and closing detection angle of the display unit using magnetic sensors without increasing the size of the electronic device. Additionally, according to the present embodiment, it is possible to share the magnet 52 for the opening and closing sensor 50 and the rotation sensor 51. In the present embodiment, although an arrangement example in which the detection angle of the opening and closing sensor 50 is set for the state of the movable unit 40 having the opening and closing angle of 175 degrees and the rotation angle of +180 degrees, the invention is not limited thereby. A modification will be described below.

[Modification]

FIG. 9A to 9C illustrate an imaging apparatus according to the modification. FIG. 9A is a rear view of the imaging apparatus, and illustrates the magnet 52 in the movable unit 40 in a transparent state. In this state, the longitudinal direction of the movable unit 40 is defined as the X-axis direction. The direction orthogonal to the X-axis direction in the drawing of FIG. 9A is defined as the Y-axis direction, and the direction orthogonal to the drawing is defined as the Z-axis direction. FIG. 9B is an enlarged view of a range 102 shown in FIG. 9A, wherein, while the periphery of the opening and closing sensor 50 and the magnet 52 are enlarged, the other areas are not shown. In FIG. 9B, the horizontal direction is the X-axis direction, and the vertical direction is the Y-axis direction. FIG. 9C is a sectional view taken along with a line B-B shown in FIG. 9B, wherein the horizontal direction shows the X-axis direction, and the vertical direction shows the Z-axis direction.

In the modification, the opening and closing sensor 50 and the magnet 52 are arranged to approach each other in a state in which the movable unit 40 has the opening and closing angle of 0 degrees and the rotation angle of 0 degrees. Additionally, in FIG. 9B, the left side of the magnet 52 is the north pole and the right side thereof is the south pole, and disposed to have a magnetization direction in the X-axis direction. The measurement center of the magnetic field detection of the opening and closing sensor 50 is positioned on the opening and closing axis 45. As indicated by the direction of the arrow 56 in FIG. 9C, the opening and closing sensor 50 is arranged to detect the magnetic field in a direction having a predetermined angle ω in the XZ plane. When viewed from the Y-axis direction, the angle ω indicates an angle between the mounting surface and the attachment surface of the opening and closing sensor 50 with respect to the X-axis direction, and in this example, the angle is an obtuse angle. In this configuration, a case in which, for example, the opening and closing angle is 10 degrees or less and the magnetic flux density by the magnet 52 exceeds the threshold of the opening and closing sensor 50 is assumed. In the state having the opening and closing angle of 0 degrees and the rotation angle of 0 degrees, the opening and closing sensor 50 transitions to the state of ON-detection. If the opening and closing angle has exceeded 10 degrees, the opening and closing sensor 50 transitions to the state of OFF-detection. The system control unit 30 determines the closing detection of the movable unit 40 due to the ON-detection of the opening and closing sensor 50, and controls the LCD panel 41 so as to be turned off. Also in this case, the opening and closing detection angle can be easily changed by only rotating the magnetic field detecting direction of the opening and closing sensor 50 in the XZ plane.

While the embodiments of the invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-012898 filed Jan. 27, 2015 which is hereby incorporated by reference herein it their entirety.

The invention claimed is:

1. An electronic device comprising:
a body unit;
a movable unit;
a two-axis rotation means that connects the body unit and the movable unit;
a magnetic field generating means that is disposed in the movable unit;
a first magnetic sensor that is disposed in the body unit, detects a magnetic field generated by the magnetic field generating means, and outputs a signal; and
a second magnetic sensor that is disposed in the body unit, detects a magnetic field generated by the magnetic field generating means, and outputs a signal,
wherein each unit is implemented by one or more processors, circuitry or a combination thereof,
wherein the two-axis rotation means has a first axis and a second axis orthogonal to the first axis,
wherein the magnetic field generating means generates a magnetic field orthogonal to the first axis direction,
wherein the first magnetic sensor is disposed to detect a magnetic field in the first axis direction,
wherein the second magnetic sensor detects a magnetic field in a direction orthogonal to the first axis,
wherein the first magnetic sensor and the second magnetic sensor are disposed so as to align in the first axis direction,
wherein the first magnetic sensor and the second magnetic sensor cannot detect the magnetic field generated by the magnetic field generating means in a first state where the movable unit is housed in the body unit,
wherein the first magnetic sensor and the second magnetic sensor cannot detect the magnetic field generated by the magnetic field generating means in a second state where the movable unit is rotated about the first axis from the first state and the movable unit protrudes from the main unit,
wherein the first magnetic sensor detects the magnetic field generated by the magnetic field generating means in a third state where the movable unit is rotated about the second axis from the second state,
wherein the first magnetic sensor detects the magnetic field generated by the magnetic field generating means in a fourth state where the movable unit is rotated about the first axis from the third state and the movable unit is housed in the body unit,
wherein a transition from the second state to the third state is detected by a change in an output of the first magnetic sensor, and
wherein the transition from the third state to the fourth state is detected by the change in an output of the second magnetic sensor.

2. The electronic device according to claim 1,
wherein, if the movable unit is rotated around the first axis, the output of the second magnetic sensor changes without a change of the output of the first magnetic sensor.

3. The electronic device according to claim 2,
wherein the movable unit has a display surface that can display an image,
wherein the movable unit inverts the vertical and horizontal directions of the image displayed on the display surface, based on the output of the first magnetic sensor, and
wherein the movable unit inverts the horizontal direction of the image displayed on the display surface, based on the output of the second magnetic sensor.

4. The electronic device according to claim 3, further comprising:
a detection means that detects that the movable unit is accommodated in the body unit,
wherein, if the detection means detects that the movable unit is accommodated in the body unit without detecting the magnetic field generated by the magnetic generating means by the first magnetic sensor, the image is not displayed.

5. The electronic device according to claim 1,
wherein the first magnetic sensor and the second magnetic sensor are an MR (magnetic resistance) element.

6. The electronic device according to claim 1,
wherein the magnetic field generating means and the second magnetic sensor are arranged so as to align in a direction orthogonal to the first axis in the vicinity of a line orthogonal to the first axis.

7. The electronic device according to claim 1,
wherein the second magnetic sensor cannot detect the change in the magnetic field in the first axial direction,
wherein the first magnetic sensor cannot detect the change in the magnetic field in the second axial direction and
wherein both of the first magnetic sensor and the second magnetic sensor detect the magnetic field generated by the magnetic field generating means in the third state.

8. The electronic device according to claim 1,
wherein the second magnetic sensor cannot detect generated by the magnetic field generating means in the fourth state where the movable unit is housed in the body unit.

9. The electronic device according to claim 1,
wherein the transition from the third state to the fourth state is detected by the change in an output of the first magnetic sensor.

* * * * *